US012775789B2

(12) United States Patent
Gore et al.

(10) Patent No.: US 12,775,789 B2
(45) Date of Patent: Oct. 27, 2026

(54) SYSTEMS AND METHODS FOR OPTIMIZING LANGUAGE MODELS BASED ON USER CONTEXT

(71) Applicant: Zeta Global Corp., New York, NY (US)

(72) Inventors: Neej Gore, San Francisco, CA (US); Winnie Shen, New York, NY (US)

(73) Assignee: Zeta Global Corp., New York, NY (US)

( * ) Notice: Subject to any disclaimer, the term of this patent is extended or adjusted under 35 U.S.C. 154(b) by 204 days.

(21) Appl. No.: 18/611,634

(22) Filed: Mar. 20, 2024

(65) Prior Publication Data

US 2024/0320424 A1 Sep. 26, 2024

Related U.S. Application Data

(60) Provisional application No. 63/453,468, filed on Mar. 20, 2023.

(51) Int. Cl.
*G06F 40/20* (2020.01)

(52) U.S. Cl.
CPC .................................... *G06F 40/20* (2020.01)

(58) Field of Classification Search
CPC ................................ G06F 40/20; G06F 40/30
See application file for complete search history.

(56) References Cited

U.S. PATENT DOCUMENTS

2014/0279736 A1* 9/2014 Glass ............... H04N 21/44213 706/12
2019/0005024 A1* 1/2019 Somech .................. H04L 67/14
2021/0044674 A1* 2/2021 Govan ................... G06Q 50/01
2023/0259692 A1* 8/2023 Wright .................... G06F 40/56 704/9
2024/0160902 A1* 5/2024 Padgett ................ G06N 3/0895
2024/0256792 A1* 8/2024 Maschmeyer .......... G06F 40/40
2024/0422226 A1* 12/2024 Roach ................. H04L 67/1396

* cited by examiner

*Primary Examiner* — Philip H Lam
(74) *Attorney, Agent, or Firm* — Schwegman Lundberg & Woessner, P.A.

(57) ABSTRACT

The subject technology uses context models to improve the performance of language models. The technology may introduce one or more context insights into the prompts for language models to personalize the outputs of the language models for particular users. The context insights may include consumer dimensions determined based on identity data for a user. The consumer dimensions may be generated using machine learning techniques that are applied to consumer data, event data, and transaction data. A unique context model may be trained for each consumer dimension to increase the accuracy and specificity of the context models. The personalized content generated by the language models may be included in a piece of content published on a publication network. The performance the language models may be optimized based on the performance of the published content.

18 Claims, 10 Drawing Sheets

1000

1004 1002

1006

```
if(apiCallType == "describe"){
    if(p-dimensions != ""){
        requestContent = "I'm "+identifier+". I'm a "+firstpdimension+" individual. Can you write a witty
    paragraph about me that is gender neutral and stats with 'Let me introduce'?"
    }
    if(i-dimensions != ""){
        requestContent = "I'm "+identifier+". I read and browse online about "+firstidimension+". I am interested
        in "+secondidimension+" Can you write a witty paragraph about me that is gender neutral and starts with
        Let me introduce'?"
    }
    if(p-dimensions != "" && i-dimensions != "" ){
        requestContent = "I'm "+identifier+". I'm a "+firstpdimension+" individual. I read and browse online about
        "+firstidimension+". I am interested in "+secondidimension+"  Can you write a witty paragraph
    about me that is gender neutral and stats with 'Let me introduce'?"
    }}
```

FIG. 10

SYSTEMS AND METHODS FOR OPTIMIZING LANGUAGE MODELS BASED ON USER CONTEXT

PRIORITY CLAIM

This patent application claims the benefit of priority, under 35 U.S.C. Section 119(e), to Gore et al, U.S. Provisional Patent Application Ser. No. 63/434,931, entitled "ARTIFICIAL INTELLIGENCE SYSTEM FOR LANGUAGE GENERATION," filed on Mar. 20, 2023, which is hereby incorporated by reference in its entirety.

TECHNICAL FIELD

The subject matter disclosed herein generally relates to the technical field of machine learning used in a network-based computing environment. In particular, the disclosure recites improved artificial intelligence (AI) technology that leverages combinations of machine learning models and AI systems to generate natural language.

BACKGROUND

The present subject matter seeks to address technical problems existing in leveraging the combined intelligence of multiple machine learning models and AI systems. The technology described herein may improve the speed and reliability of generative AI systems and the quality of natural language outputs by leveraging insights derived from machine learning during prompt construction for generative AI systems.

BRIEF DESCRIPTION OF THE DRAWINGS

Some embodiments are illustrated by way of example and not limitation in the figures of the accompanying drawings.

FIG. 10 illustrates more details to of prompt for a generative AI system, according to various embodiments described herein.

DETAILED DESCRIPTION

Figure 1:
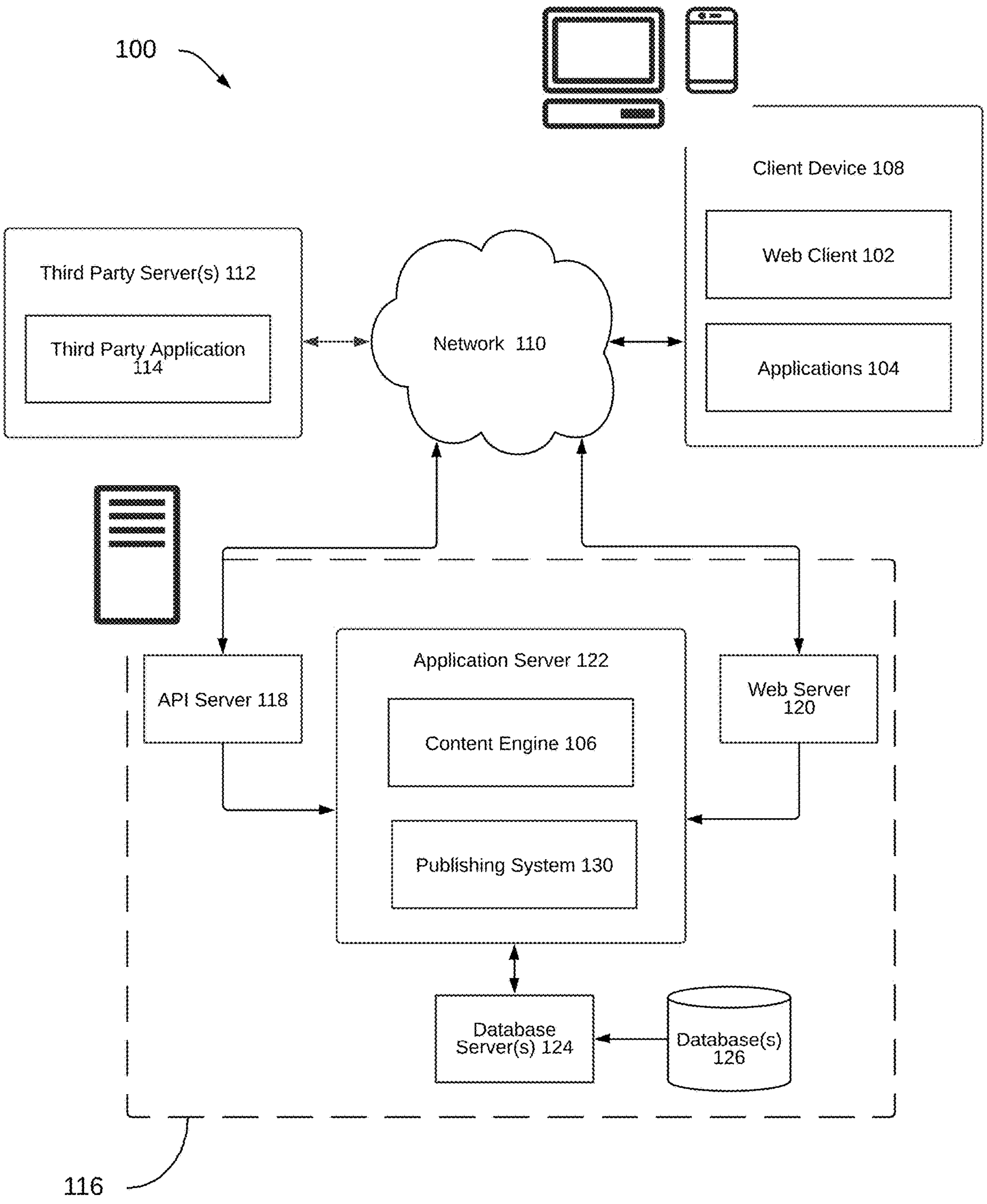
FIG. 1 is a block diagram illustrating a high-level network architecture, according to various embodiments described herein.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Large language models (LLMs) including generative pretrained transformers (GPT) and other language models trained on large corpora of text data to generate human like responses are complex machines capable of generating an infinite variety of outputs. With access to no and/or a limited context (e.g., data outside of the training corpus), language models often struggle to generate accurate or meaningful responses to specific prompts. Language models that may provide cogent responses to general prompts like "describe the difference between America and the UK" struggle with more specific prompts like "describe why brand X is likely to appeal to user Y". The content intelligence system described herein connects generative AI with a context layer to provide personalized content for specific brands and/or customers. The context layer may be implemented as a context API that provides context parameters for particular users as they interact with language models. The context parameters may be produced by applying machine learning techniques to a massive data cloud of consumer data. The context layer may integrate with a language model user interface by embedding machine learned insights into generative AI prompts. Integrating the context layer with language models improves the efficiency of generative AI systems and the quality and specificity of generative AI outputs. Content generated by the content intelligence system may be included in scalable media campaigns that may be dynamically configured to target specific segments of customers in real time across multiple platforms including mobile display, web display, linear tv, streaming, email, social media, gaming, and the like.

In various embodiments, the content intelligence system may improve the efficiency of language models and generative AI systems through prompt engineering. The content intelligence system determines context rich, personalized prompts for individual users in real time based on machine learned insights to minimize the number of prompts required to generate accurate, engaging content for each specific user. The contextual insights included in prompts determined by content intelligence system, eliminate A/B testing and other testing and validation cycles required by other systems to generate accurate responses and/or engaging content for specific topics. The content intelligence system uses the machine learned contextual insights to provide higher quality content faster and more efficiently (e.g., by requiring fewer input prompts and fewer network and compute resources to generate responses to the additional prompts). The content intelligence system also improves the quality of the outputs generated by language models by augmenting their stagnant training datasets with machine learned insights that are continuously improved and may be updated in real time. Embedding dynamic, highly specific context information into prompts gives language models access to fresh, up to date data about specific topics that are not found their training corpuses. The language models can then use the machine learned insights to generate accurate and highly personalized content for vast number of unique users (e.g., any user having one or more data points in a data cloud storing identity records). The data cloud described herein includes identity records for over 300 million unique individuals, therefore, the content intelligence system can generate accurate, unique, and meaningful content for more than 300 million individuals in real time (e.g., a fraction of a second).

The content intelligence system may be implemented within the SaaS network architecture described in FIG. 1 below so that the content generation functionality may be scaled to generate accurate, unique content for individual users included in multiple audience segments. Each audience segment may be targeted by multiple content campaigns that are specific to a brand, product, or any subject matter of interest.

With reference to FIG. 1, an example embodiment of a high-level SaaS network architecture 100 is shown. A networked system 116 provides server-side functionality via a network 110 (e.g., the Internet or WAN) to a client device 108. A web client 102 and a programmatic client, in the example form of a client application 104, are hosted and execute on the client device 108. The networked system 116 includes an application server 122, which in turn hosts a content engine 106 and a publishing system 130 (such as a demand side platform (DSP), message transfer agent (MTA), email service provider (ESP), and the like) that provide a number of functions and services to the client application 104 that accesses the networked system 116. The client application 104 also provides a number of graphical user interfaces (GUIs) described herein that may be displayed on one or more client devices 108 and may receive inputs thereto to configure an instance of the client application 104 and monitor operations performed by the application server 122. For example, the client application 104 may provide campaign setup user interfaces for selecting campaign configuration settings, a content personalization user interface for editing language model prompts, viewing generated content, and the like, a campaign monitoring user interface for tracking campaign performance, and the like which can present outputs to a user of the client device 108 and receive inputs thereto in accordance with the methods described herein.

The client device 108 enables a user to access and interact with the networked system 116 and, ultimately, the content engine 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The content engine 106 hosted by the application server 122 may include components or applications described further below. The publishing system 130 hosted by the application server may distribute content generated by the content engine 106. The application server 122 is, in turn, shown to be coupled to a database server 124 that facilitates access to information storage repositories (e.g., a database 126). In an example embodiment, the database 126 includes storage devices that store information accessed and generated by the content engine 106.

The publishing system 130 may be a DSP, ESP, MTA or other system that distributes content digitally over a network. For example, the publishing system may be a DSP that includes an integrated bidding exchange, an online demand side portal accessible to a targeted content provider, and an online supply side portal accessible to a publisher of content on the network 110. The bidding exchange may be communicatively coupled to the demand side portal and the supply side portal to present user interfaces enabling receipt of bids from a brand or other media provider for placement of content generated by the content engine 106 and other media by a publisher at a specified location or domain in available inventory on the publication network 110. In some examples, the publication system 130 may be configured to present media including content from the content engine 106 to a user at the specified location or domain on the publication network. The demand side portal may be configured to reserve, upon resolving of a successful bid from the media provider, the specified location or domain for placement of media. The demand side portal may then publish the piece of media at the reserved placements. Accordingly, the publication system 130 and content engine 106 may work in concert to enable scale digital media campaigns that include one-to-one personalized content for each of the users in the target audience of the campaign. Users accessing the locations including the reserved placements may view and engage with the media. In some examples, the publication system 130 is further configured to process a transaction between the media provider and the publisher based on the presentation or a viewing of the targeted media by the user, or a third party.

In embodiments having a publication system 130 including an ESP, the ESP and the content engine 106 may work in concert to enable scalable email campaigns that include one-to-one personalized content for each of the users in the target audience of the campaign. The content engine 106 may generate personalized content for each user in the target audience and transmit the personalized content to the ESP included in the publication system 130. The ESP may generate email messages that include the personalized content and transmit the messages to the email addresses of the users in the target audience.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a generative AI system, website, streaming platform hosted by a third party.

Turning now specifically to the applications hosted by the client device 108, the web client 102 may access the various systems (e.g., the content engine 106) via the web interface supported by the web server 120. Similarly, the client application 104 (e.g., a digital marketing "app") accesses the various services and functions provided by the content engine 106 via the programmatic interface provided by the API server 118. The client application 104 may be, for example, an "app" executing on the client device 108, such as an iOS or Android OS application, to enable a user to access and input data on the networked system 116 in an offline manner and to perform batch-mode communications between the client application 104 and the networked system 116. The client application 104 may also be a web application or other software application executing on the client device 108.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The content engine 106 could also be implemented as a standalone software program, which does not necessarily have networking capabilities.

Figure 2:
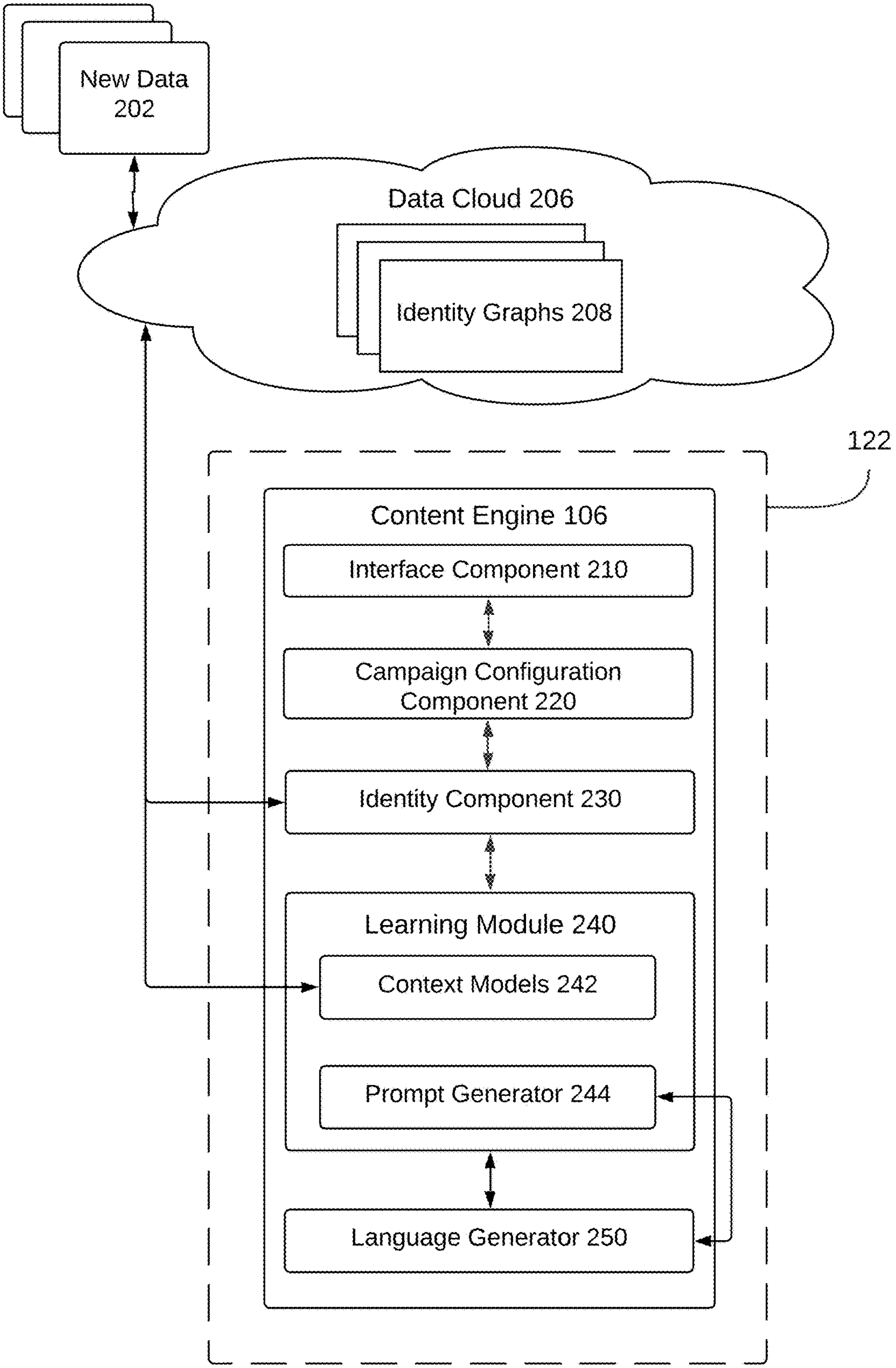
FIG. 2 is a block diagram showing architectural aspects of a content engine, according to various embodiments described herein.

FIG. 2 is a block diagram showing architectural details of a content engine 106, according to some example embodiments. Specifically, the content engine 106 is shown to include an interface component 210 by which the content engine 106 communicates (e.g., over a network 110) with other systems within the SaaS network architecture 100.

The interface component 210 is collectively coupled to one or more campaign configuration components 220 that operate to provide specific aspects of configuring and optimizing content provided by the content engine 106 and media campaigns that distribute the content, in accordance with the methods described further below with reference to the accompanying drawings. The campaign configuration component 220 may be used to identify a target audience of users that may receive personalized content. The campaign configuration component 220 be connected to an identity component 230 that resolves an identity for each user in the target audience. The identity component 230 may resolve identities for users by extracting one or more pieces of identity data included in a request for personalized content and matching the identity data to identity records for the target user stored in the data cloud 206. The identity data may include a unique identifier for a user, for example, a data_cloud_ID, a name, a physical address, a cookie, a device_ID, an email address, a user_ID, and the like. One or more of the unique identifiers may be encrypted using a hash algorithm (e.g., SHA-256) or other encryption algorithm and the hashed version of the unique identifier may be stored included in content personalization requests and stored in the data could 206.

Identity records in the data cloud 206 may be stored in identity graphs 208 that include multiple nodes and edges connecting two or more nodes. Each node may include a unique identifier and one or more consumer attributes associated with the unique identifier may be stored as node metadata. Consumer attributes may include one or more pieces of consumer data (e.g., location data, demographic data, device metadata, machine learned attributes, interest codes, and the like), event data (e.g., impressions and other engagement data, and the like) and transaction data (purchase records, purchase amounts, transaction metadata, and the like) associated with the target user. For example, one node may be an email address (e.g., targetcustomer@gmail.com) and the identity attributes included as node metadata may include event data listing timestamped records of emails sent to the email address and open and clickthrough events for the sent emails. Other node metadata may include transaction data listing timestamped purchase records for products ordered using the email address and consumer data listing a physical address, device ID or other identifier associated with the email address, interest codes that identity the subject of webpages accessed by the email address, and the like.

One or more machine learned insights may also be included as consumer attributes that are stored in node metadata. The machine learned insights may be determined using one or more machine learning models trained on data cloud data (e.g., consumer data, event data, transaction data stored in identity graphs 208) and one or more external datasets. As described in more detail below, the machine learned insights may include I-scores indicating a user's interest in a brand or likelihood to purchase a product and P-scores indicating a behavioral traits and other aspects of a user's personality. The I-scores may include brand propensity scores (e.g., a predicted likelihood a user will shop at store of a particular brand, purchase a particular brand of athletic shoes or other goods, view content published by a particular brand on one or more digital media channels, and the like), brand affinity scores (e.g., a predicted likelihood of how frequently and/or consistently users engage with particular brands, for example, how often users will purchase products made by the brand, click or view ads or emails sent by the brand, visit a particular brand website, and the like), product propensity scores (e.g., a predicted likelihood a user will buy or show interest in (e.g., view/click content related to) particular products or services), and the like. P-scores may include an attitude or behavioral propensity score (e.g., a predicted likelihood a user is materialistic, athletic, health conscious, frugal, aggressive, or other personality trait) or a channel propensity score (e.g., a predicted likelihood a user will engage with content on email, web page display, mobile display, connected tv, linear tv, gaming, social media, or other digital media channel).

To resolve an identity record for the target customer, the identity component 230 may receive a personalized content request from a client device. The identity component may extract identity data for one or more users of a target audience included in the personalized content request and search the identity records stored in the data cloud 206 for records that match the user identity data. For example, the identity component 230 may parse the identity graphs 208 using a grid search algorithm to determine a match between a piece of identity data for a user and an identifier node in the identity graphs 208. During identity resolution, the identity component 230 may match identity data for a target user to an identifier included in an identity record (e.g., a single node) or an identifier included in an identity cluster (e.g., a cluster of multiple related nodes). The identity component 230 may match the identity data with an identifier node or identity cluster using a tiered matching scheme that prioritizes an identifier over one or more other identifiers in the identity record based on a value of a recency metric. The recency metric measure how recently the identifier was used by a user. The recency metric may be determined based on timestamp records included in node metadata for each identifier. The timestamp records may include a date and time when the identifier was included in each piece of event data stored in the data cloud. The recency metric may be determined dynamically during identity resolution for each personalized data request by, for example, calculating an inverse of a temporal distance between a current date and/or time and the average, most recent, or other selection of the dates and/or times included in the timestamp records for each identifier. Identifiers that are used more recently (e.g., have timestamps closer to the present time) may have a larger value for the recency metric and may be prioritized for matching by the identity component 230. Identity clusters may be determined based on pre-determined linkages between the identifiers of two or more nodes. Once the identity of the target user resolved, the node metadata for the node corresponding to matched identifier or the node metadata each node included in the matched identity cluster may be transmitted to the learning module 240.

The identity graphs 208 may include hundreds of millions of unique nodes and billions of edges. The identity graphs 208 may be dynamically updated by adding, deleting, and/or modifying nodes, node metadata, and/or edges based on new data 202 ingested by the data cloud 206. The new data 202 may include consumer data, event data, and/or transaction data received from a demand side platform, email service provider, or other publishing system that distributes media (e.g., text, image data, video content, audio content, streaming content, extended reality (XR) content including virtual reality (VR) content, augmented reality (AR) content, mixed reality (MR) content and any other form of XR content, and the like) over the Internet or other computer network. To improve the efficiency and accuracy of the identity resolution process the identity component 230 may resolve the identity for target users and/or users of a target audience in real time upon receiving a personalized content request and/or each time the identity graphs 208 are updated. The identity component 230 may also perform identity resolution for a target user and/or users of a target audience on a pre-determined schedule (e.g., every hour, every day, and the like).

Identity attributes for target users determined by the identity component 230 may be provided to the learning module 240. The learning module 240 may include one or more context models 242 that provide the machine learned insights for content personalization and a prompt generator 244 that incorporates the machine learned insights into a prompt used to generate natural language output from a language model.

To generate personalized content, prompts determined by the prompt generator 244 may be transmitted to a language generator 250. The language generator 250 may include one or more language models that may generate natural language text, images, and other content personalized based on a text description included in the prompts. The language models may be implemented as generative pre-trained transformer models that have a decoder-only transformer network with a context window having a pre-defined number of tokens and pre-trained parameters. The language models may be trained to predict the next token of text based on the previous tokens of text in a sequence. The language models may tokenize the text included in an input prompt, ingest the tokens, and generate a personalized text output that is specific to the ingested tokens.

It should be understood that the content engine 106 may include one or more instances of each of the components. For example, the content engine 106 may include multiple instances of the learning module 240 and multiple instances of the language generator 250 with each instance being operated to host different context models 242, prompt generators 244, and different language models respectively.

Figure 3:
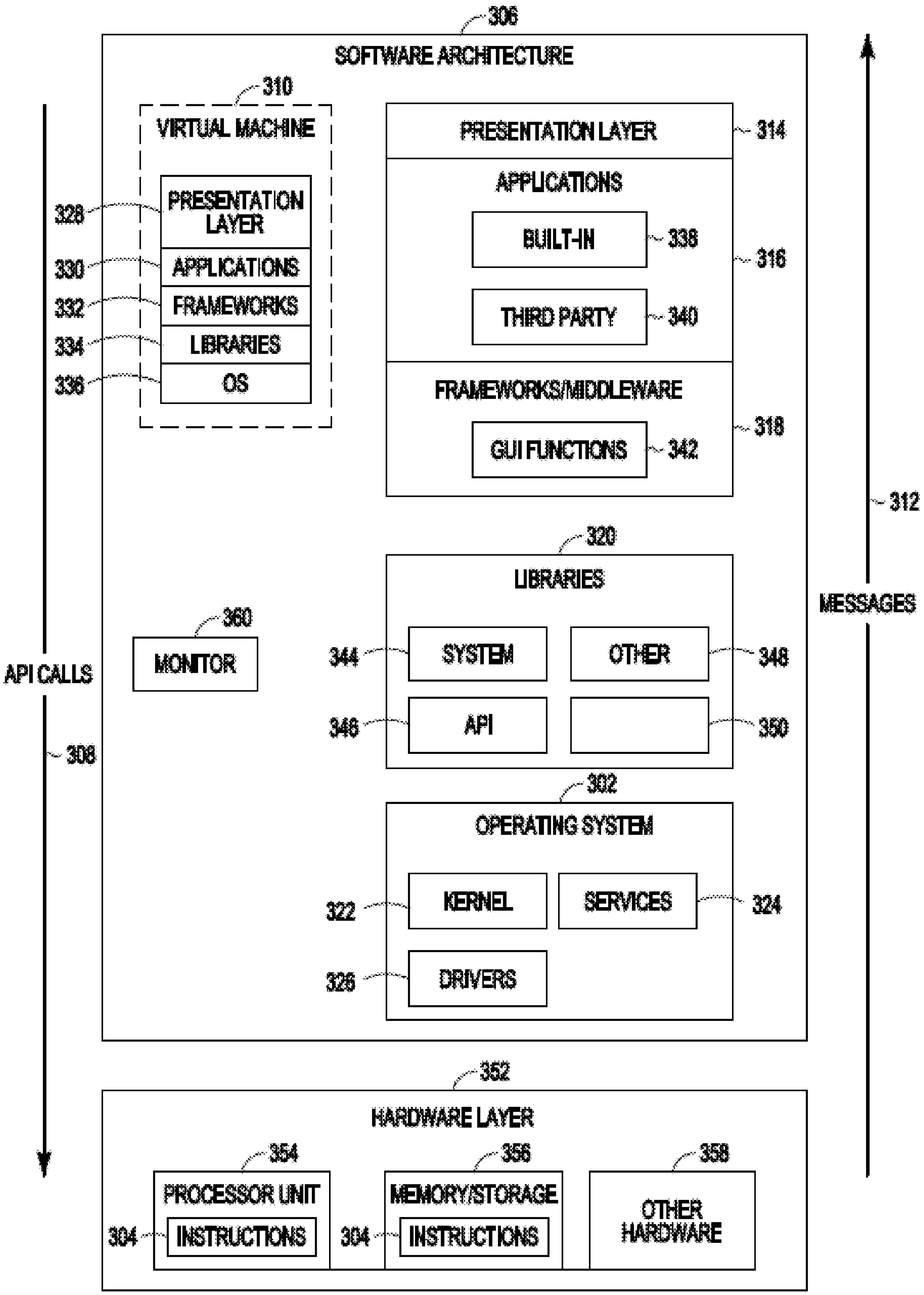
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, a publishing application, a content application, a campaign configuration application, performance monitoring application, a scoring application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™ WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
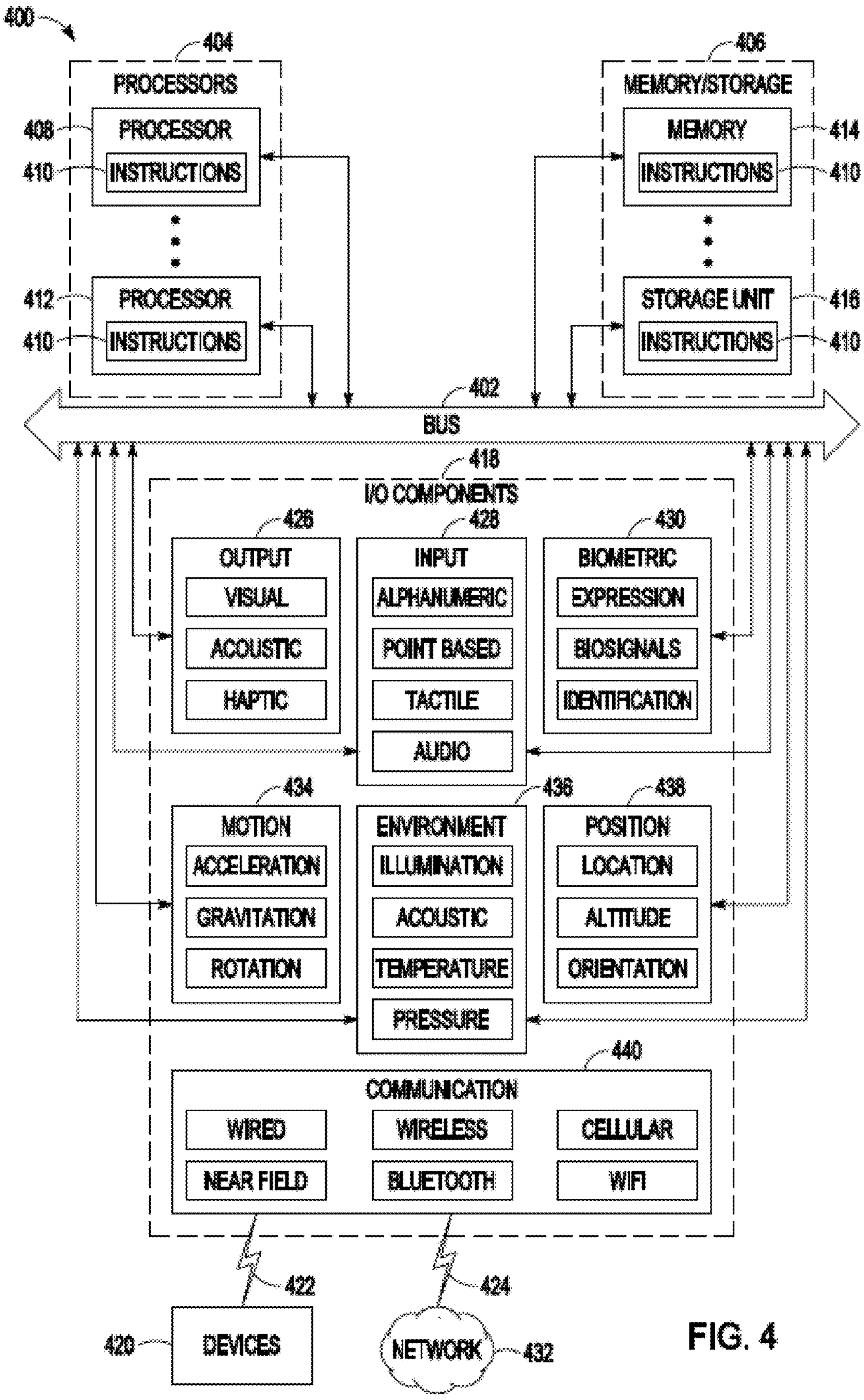
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a non-transitory machine-readable medium (e.g., a non-transitory machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Some examples use machine learning to determine context dimensions for a personalized data request. Prompts for language models may be assembled using the context dimensions to generate personalized content for a particular user, brand, and/or product. The context dimensions may be generated by one or more context models that are trained on datasets of encoded and normalized features extracted from identity records stored in a data cloud. The context dimensions for a target user may be included in a prompt used to elicit personalized content from a language model. The personalized content may be distributed to client devices over a network to increase the level of engagement a target audience has with content from specific publishers and increase the likelihood of achieving a desired outcome. For example, the personalized content may increase the likelihood users in a target audience will view or click on a piece of content, visit a physical or digital location, complete a transaction, and the like. These examples improve the functionality of language models by augmenting the general purpose training corpus used to train language models with context dimensions that may be used to personalize the outputs (e.g., natural language text) of the language models for particular users, brands, and/or products. Augmenting the general intelligence of language models achieved through training on general purpose datasets, with an acute intelligence of specific users and contexts achieved by exposing the models to specific context dimensions improves the quality of the output generated by the language models. Incorporating the context dimensions into prompts also improves the efficiency of language models by reducing the number of prompts and revisions required to generate content that will resonate with specific users and accurately capture the characteristics of specific brands and products.

These examples also improve the functionality of DSPs, ESPs, and other networked content publishing systems by increasing the likelihood media campaigns will achieve their pre-defined key performance indicators (KPIs) (e.g., meet thresholds for open rate, click through rate, conversion rate, visit rate, and other engagement/desired outcome metrics). These examples may also improve the efficiency of DSPs, ESPs, and other networked content publishing systems by decreasing the amount of computational resources (e.g., processor, memory, network, and the like) and financial resources wasted on running campaigns that do not to meet their predetermined goals (e.g., the pre-defined threshold for one or more KPIs).

Compared with previous approaches of training personalized language models that rely on rudimentary statistical analysis of consumer data (or rules based approaches to content generation), the machine learning techniques described herein leverage deep learning models that jointly consider multiple features determined from identity records. In various embodiments, deep belief network (DBN) models, generative adversarial network (GAN) models, one-class deep support-vector data description (OCD-SVDD) models, and other deep learning models included in the learning module may learn the interactions between different combinations of encoded and normalized features and the context of each feature within the identity records as a whole to identify complex patterns of features that indicate context dimensions of a particular user (e.g., interest, behavior, and personality), brand, and/or product. For example, the deep learning models may predict context dimensions based on multiple features included in a user's identity records and detect patterns of features across millions of identity records that indicate a particular dimension that may not be obvious even to behavioral experts. The machine learning techniques used herein may also combine multiple deep learning models to form ensemble models that determine context dimensions based on the relative success of each individual model at analyzing different types of identity records and identifying specific context dimensions.

The context dimensions may include consumer dimensions for one or more users. To determine consumer dimensions, a set of input identity records for a user is passed through each trained deep learning model. A trained model for each consumer dimension (e.g., "price sensitive", "intelligent" "interested in technology", and the like) may score the identity records. In various embodiments, input identity records may be scored by three hundred or more models to determine P-scores and I-scores for hundreds of consumer dimensions. The models may output a scaled score for each dimension (e.g., a numerical value between 0 and 1, a percentage, and the like) and the output scores may be thresholded (e.g., compared to a pre-determined threshold score for each dimension) to determine the consumer dimensions. For example, users with records having scores that meet or exceed the predefined dimension threshold (e.g., 0.8) for a particular dimension (e.g., price-sensitive) may be classified as having the particular dimension.

In examples with multiple models scoring each of the dimensions, an aggregate score for the dimensions may be determined by combining the outputs from two or more of the individual models. For example, the outputs from each model may be combined by weighted voting. In various embodiments, each of the three models vote on a verdict, and the votes are weighted by the accuracy of the model as measured on a testing dataset. The weighted votes are then aggregated to determine a prediction.

The consumer dimensions for each identity records determined by the machine learning models may be appended to the identity records for a user that are stored in the data cloud. To generate personalized content for a user, a prompt generator may extract the consumer dimensions from the user's identity records. The consumer dimensions may then be filtered to reduce the number of consumer dimensions and engineer the prompt to elicit a targeted output from a language model that is personalized to the user but also optimized to achieve one or more campaign KPIs. The filtered dimensions may be embedded into one or more segments of a prompt and submitted to a generative AI system that returns targeted, personalized content generated by a language model.

Figure 5:
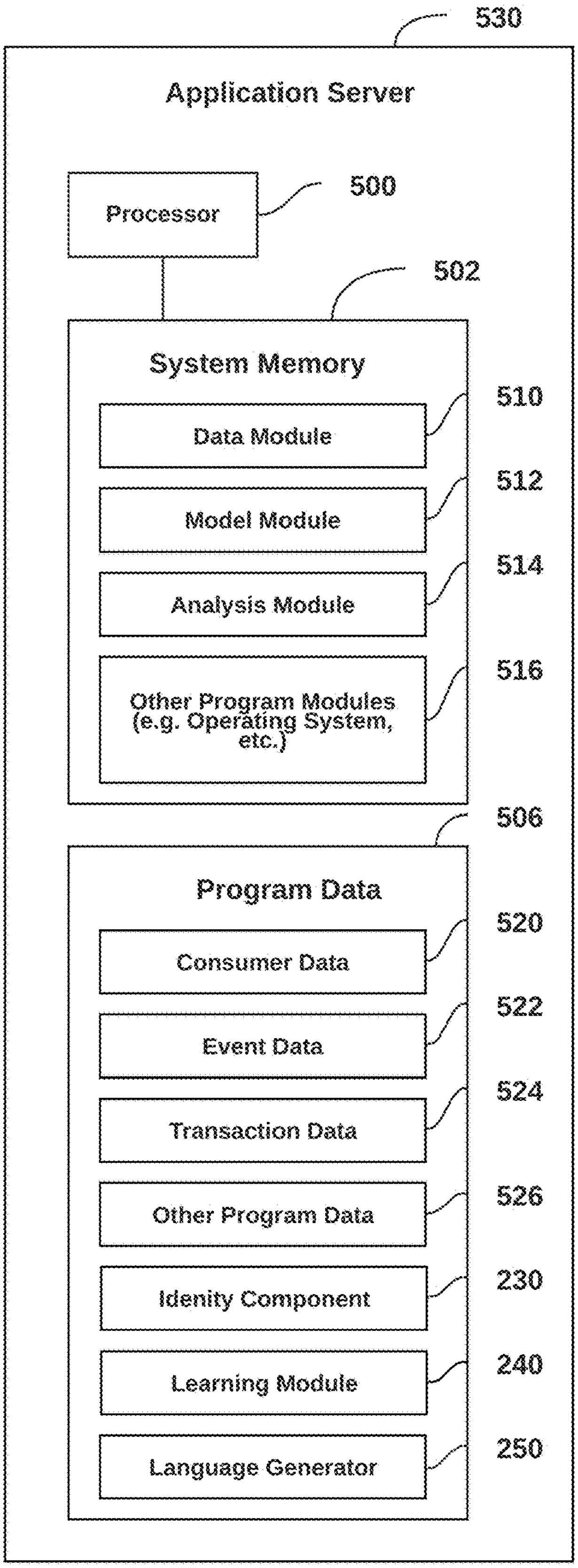
FIG. 5 depicts aspects of an implementation of one or more components of a content engine, according to various embodiments described herein.

FIG. 5, illustrates an application server 530 hosting a content engine. The application server 530 may be implemented as the application server 122 of FIG. 1. The application server 530 may also be implemented as a content server that is optimized for the content engine. The application server 530 may receive one or more personalized data requests from one or more client devices and provide via the content engine personalized content in return. The application server 122 may include at least one processor 502 coupled to a system memory 504. The system memory 504 may include computer program modules 506 and program data 508. In this implementation, program modules 506 may include a data module 510, a model module 512, an analysis module 514, and other program modules 516 such as an operating system, device drivers, and so forth. Each module 510 through 516 may include a respective set of computer-program instructions executable by one or more processors 502.

This is one example of a set of program modules, and other numbers and arrangements of program modules are contemplated as a function of the particular design and/or architecture of the content engine. Additionally, although shown as a single application server, the operations associated with respective computer-program instructions in the program modules 506 could be distributed across multiple computing devices. Program data 508 may include consumer data 520, event data 522, and transaction data 524, and other program data 526 such as data input(s), third-party data, and/or others. In some examples, the content engine includes an identity component 230, learning module 240, and language generator 250 described further below.

In various embodiments, consumer data 520, event data 522, and transaction data 524, from multiple identity records may be assembled into training samples. For example, one or more training samples of segments of identity records corresponding to customers known to have a particular consumer dimension may be identified and the learning module 240 may aggregate the consumer data 520, transaction data 522, and event data 524 for the identity records included in the training samples. The consumer data 520, transaction data 522, and event data 524 for the identity records included in the training samples may be encoded and/or normalized to generate a set of training features.

The learning module 240 may use the training features to train various context models 242 to predict consumer dimensions for users. The context models 242 may include unique models 662A, . . . , 662N for each consumer dimension. For example, the learning module 240 may train a logistic regression or other linear model. The learning module 240 may also train non-linear models including a deep learning models such as a support vector data description (SVDD) model, a generative adversarial network (GAN) model, a deep belief network (DBN) model, and the like. Prompts for language models may incorporate one or more of the consumer dimensions determined for each identity record. The language models may use the prompts to generate personalized content for specific users. The personalized content may be included in one or more pieces of media published online by a DSP, ESP, or other publishing system.

Figure 6:
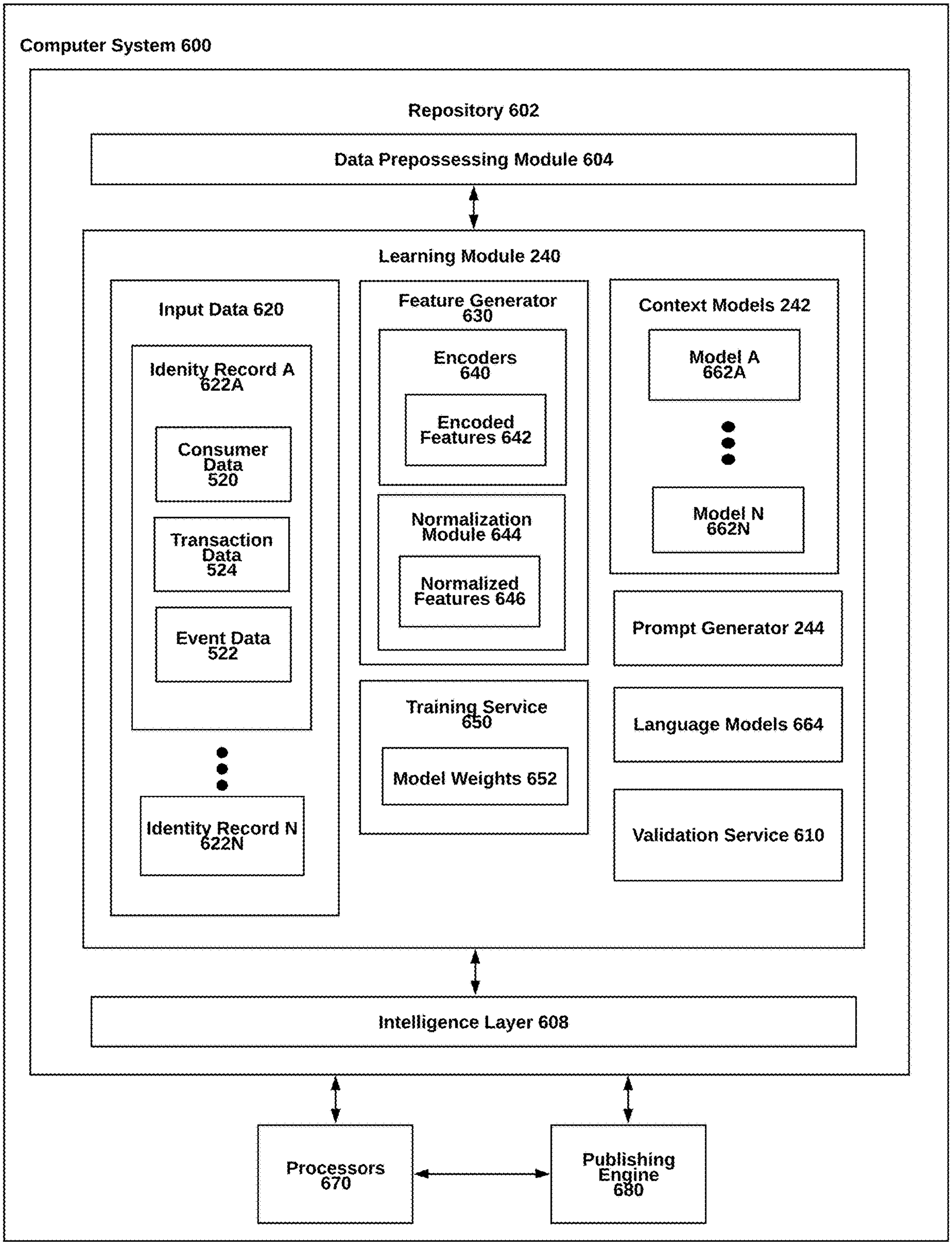
FIG. 6 depicts aspects of a learning module, according to various embodiments described herein.

FIG. 6 is a block diagram illustrating more details of the learning module 240 in accordance with one or more embodiments of the disclosure. The learning module 240 may be implemented using a computer system 600. In various embodiments, the computer system 600 may include a repository 602, a publishing engine 680, and one or more computer processors 670. In one or more embodiments, the computer system 600 takes the form of the application server 122 described above in FIG. 1 or takes the form of any other computer device including a processor and memory. In one or more embodiments, the computer processor(s) 670 takes the form of the processor 500 described in FIG. 5.

In one or more embodiments, the repository 602 may be any type of storage unit and/or device (e.g., a file system, database, collection of tables, or any other storage mechanism) for storing data. Further, the repository 602 may include multiple different storage units and/or devices. The multiple different storage units and/or devices may or may not be of the same type or located at the same physical site. The repository 602 may include a data preprocessing module 604, the learning module 240, and an intelligence layer 608.

At runtime, a publishing engine 680 of the publishing system may provide a request for personalized content to the intelligence layer 608. The learning module 240 may determine a prompt for a language model that may be used to generate personalized content for one or more users. The intelligence layer 608 may display the prompt to a language model (e.g., a language model of a generative AI system) and return the personalized content output by language model to the publishing engine 680. Personalized content may be incorporated into one or more pieces of content (e.g., lines of text, images, articles, emails, display ads, text messages, linear tv ads, segments of streaming video, video game components, virtual reality media, and the like) generated by the publishing engine 680. The publishing system may run one or more campaigns that publish the pieces of content including the personalized content on an online publication network. For example, the publishing system may send an email including the personalized content, place a display ad including the personalized content on a website, return the personalized content in a text message or other digital message sent from a chatbot, and the like.

The data preprocessing module 604 includes programing instructions for performing Extract, Transform, and Load (ETL) tasks. The ETL jobs process input data 620 (e.g., identity records 622A, . . . , 622N including consumer data 520, transaction data 524, and event data 522) to prepare training samples for the context models 242. To prepare the training samples, the data preprocessing module 604 may segment identity records 622A, . . . , 622N based on the consumer dimensions included in each of the identity records 622A, . . . , 622N. In various embodiments, the learning module 240 may train a unique context model 242 for each consumer dimension. To prepare the training samples for each context model 242, the data preprocessing module 604 may segment identity records 622A, . . . , 622N based on the consumer dimensions included in each identity record 622A. For example, the data preprocessing module 604 may select identity records 622A, . . . , 622N for users known to be price sensitive (e.g., identity records having a price sensitive consumer dimension). The learning module 240 may train each context model on its corresponding segment of identity records 622A, . . . , 622N (e.g., the context model for price sensitivity may be trained on the segment of identity records 622A, . . . , 622N having price sensitivity as a consumer dimensions).

The data preprocessing module 604 may also process new and/or updated identity records that include new consumer data 520 (a new postal address associated with a user), new event data 522 (e.g., responses to previously generated personalized content included in completed campaigns), and/or new transaction data (e.g., purchases of products mentioned in previously generated personalized content). A DSP, ESP, or other publishing system may track clicks, views, conversions, and other event data capturing responses of users to pieces of content that include personalized content. The responses may be stored in the identity records of the users receiving the personalized content and the data preprocessing module 604 may the select new and/or updated identity records including the responses as input data 620 for retraining the context models 242 and/or language models 664. The learning module 240 may retain context models 242 that were originally trained on historical event data with the new set of input data 620 to continuously improve the accuracy of the consumer dimensions predicted by the context models 242. The retaining process may also increase one or more confidence metrics of the context models 242 and increase the specificity of generative AI outputs created using prompts that include the consumer dimensions.

To retrain the language models 664, the learning module 240 may determine one or more outcome metrics for personalized content based on new event data 522 and/or transaction data 524 recorded in response to a publication of the personalized content in one or more campaigns. Positive outcome metrics may be determined based on new event data 522 indicating users engaged with (e.g., displayed, viewed, clicked on, and the like) a piece of content (e.g., email, text message, display ad, and the like) including the personalized content. Positive outcome metrics may also be determined based on new transaction data indicating users purchased one or more products included in a piece of content including the personalized content. The learning module 240 may assemble fine tuning samples that include personalized content having positive outcome metrics and language models may be retrained on the fine tuning samples to improve the quality of personalized content generated by the models.

Segments of identity records 622A, . . . , 622N selected by the data preprocessing module 604 may be aggregated as input data 620 that is fed into the feature generator 630. The input data 620 may include consumer data 520, transaction data 524, and event data 522 for the identity records 622A, . . . , 622N included in each segment. For example, input data may include several hundred or several thousand identity records 622A, . . . , 622N for users known to have a particular consumer dimension (e.g., an interest in travel, an adventurous personality, high intelligence, and the like). The data preprocessing module 604 may extract data fields from the identity records so that the data fields may be processed by the feature generator 630 efficiently. For example, the data preprocessing module 604 may extract data fields from node metadata of one or more nodes or node clusters in an identity graph storing the segment of identity records. Table 1 below illustrates example data fields extracted from the identity records 622A, . . . , 622N.

TABLE 1

| Data Type | Data Field Name | Description |
|---|---|---|
| Consumer | Smart Phone User | User linked to a device ID for a smart phone |
| Consumer | Active Facebook User | User_ID linked to an active Facebook account |
| Consumer | Brand Affinity | Propensity of user to buy products/services from a brand |
| Consumer | Brand Interest | Propensity of user to view content related to a brand |
| Consumer | Product Affinity | Propensity of user to buy a product/service |
| Consumer | Product Interest | Propensity of user to view content related to a product |
| Consumer | Travel Interest | Propensity of user to view content related to travel |
| Consumer | Investment Interest | Propensity of user to view content related to inventing in stocks, bonds, real estate, etc. |
| Consumer | Age | Age of user |
| Consumer | Credit Score | Credit score of user |
| Consumer | Search for a New Career or Job | Propensity to search for a new career or job in the next 12 months. |
| Transaction | Active Retail Cards | Made a purchase on an active, open retail credit cards within the last 12 months |
| Transaction | Retail Card Balance | Dollar amount of outstanding balance on a retail card within the last 12 months |
| Transaction | Health Beauty Purchase | Purchased a health and beauty product within the last 24 months |
| Transaction | Health Beauty Purchase Amount | Dollar amount of health and beauty product purchases with the last 24 months |
| Transaction | Home Improvement Purchase | Purchased a home improvement product within the last 24 months |
| Transaction | Home Improvement Purchase | Dollar amount of home improvement product purchases with the last 24 months |

TABLE 1-continued

| Data Type | Data Field Name | Description |
|---|---|---|
| Event | DepartmentStores | Visited a department store within the last 24 months |
| Event | Malls | Visited a mall within the last 24 months |
| Event | View | Opened or viewed a piece of targeted content within the last 3 months |

The feature generator 630 may transform the consumer data 520, transaction data 524, event data 522 extracted from each of the identity records 622A, . . . , 622N included in input data 620 into features used to train the context models 242. The feature generator 630 may include a normalization module 644 and an encoder 640 that are used to generate the features. The normalization module 644 may transform the numerical data fields included in the input data 620 by determining a scaled value (e.g., a value between −1 and 1) for each of the of the numerical data fields (e.g., each unique value of a particular numerical data field). For example, each unique user age or credit score included in consumer data 520, transaction amount included in transaction data 524, and open rate or other engagement metric included in event data 522 may be multiplied by a scaling factor to determine normalized features 646 (e.g., values between −1 and 1) for each data field.

To transform the categorical data fields into features, one or more encoders 640 may compute one or more encoded features 642 for each categorical field. In various embodiments, the categorical fields may not have an ordinal relationship so the encoder may apply one hot encoding to the categorical data. The categorical data fields may be one hot encoded by first assigning each categorical variable (e.g., each unique value) for a particular categorical data field an integer value. For example, to one hot encode "Smart phones" in the product affinity data field, a value of "1" may be assigned to the "Smart phone" product category, a value of "2" may be assigned to the "Running shoes" product category, and a value of "3" may be assigned to the "Bicycles" product category. A one hot encoding may be applied to this integer representation by removing the integer encoded variable and adding a new binary variable for each unique integer value (e.g., "1,0,0" for the integer value of "1", "0, 1,0" for the integer value of "2" and "0,0,1" for the integer value of 3). This one hot encoding process may be repeated for each categorical data field that does not have an ordinal relationship. The encoders 640 may also encode categorical settings that have an ordinal relationship (i.e., are in number order) by applying an integer encoding that converts each unique value for the categorical variable into an integer.

The encoded features 642 and normalized features 646 generated by the feature generator 630 may be aggregated into feature vectors. The feature vectors may include a matrix, array, or other numerical representation of the consumer data 520, transaction data 524, and event data 522 of the identity records 622A, . . . , 622N included in input data 620. For example, the feature generator 630 may concatenate the encoded features 642 and normalized features 646 into a single n-dimensional vector for each identity record. A context models for each consumer dimension may be trained using the encoded features 642 and normalized features 646. For example, the context models 242 may be scoring models that are trained to generate I-scores and P-scores that are used to determine the consumer dimensions for the users. The I-scores and P-scores may be determined based on patterns in the features generated from the consumer data 520, transaction data 524, and event data 522 that are machine learned.

To train the context models, the encoded features 642 and normalized features 646 may be transmitted to a training service 650 that may execute multiple training routines to generate context models for each consumer dimension. The context models may be a logistic regression or other linear model. The training service 650 may also train non-linear context models including one or more deep learning models such as a deep neural network, a support vector data description (SVDD) model, a generative adversarial network (GAN) model, a deep belief network (DBN) model, and the like.

Training a unique context model for each consumer dimension (choosing unique segment of identity records, selecting a model type, selecting features for that model type)

Figure 7:
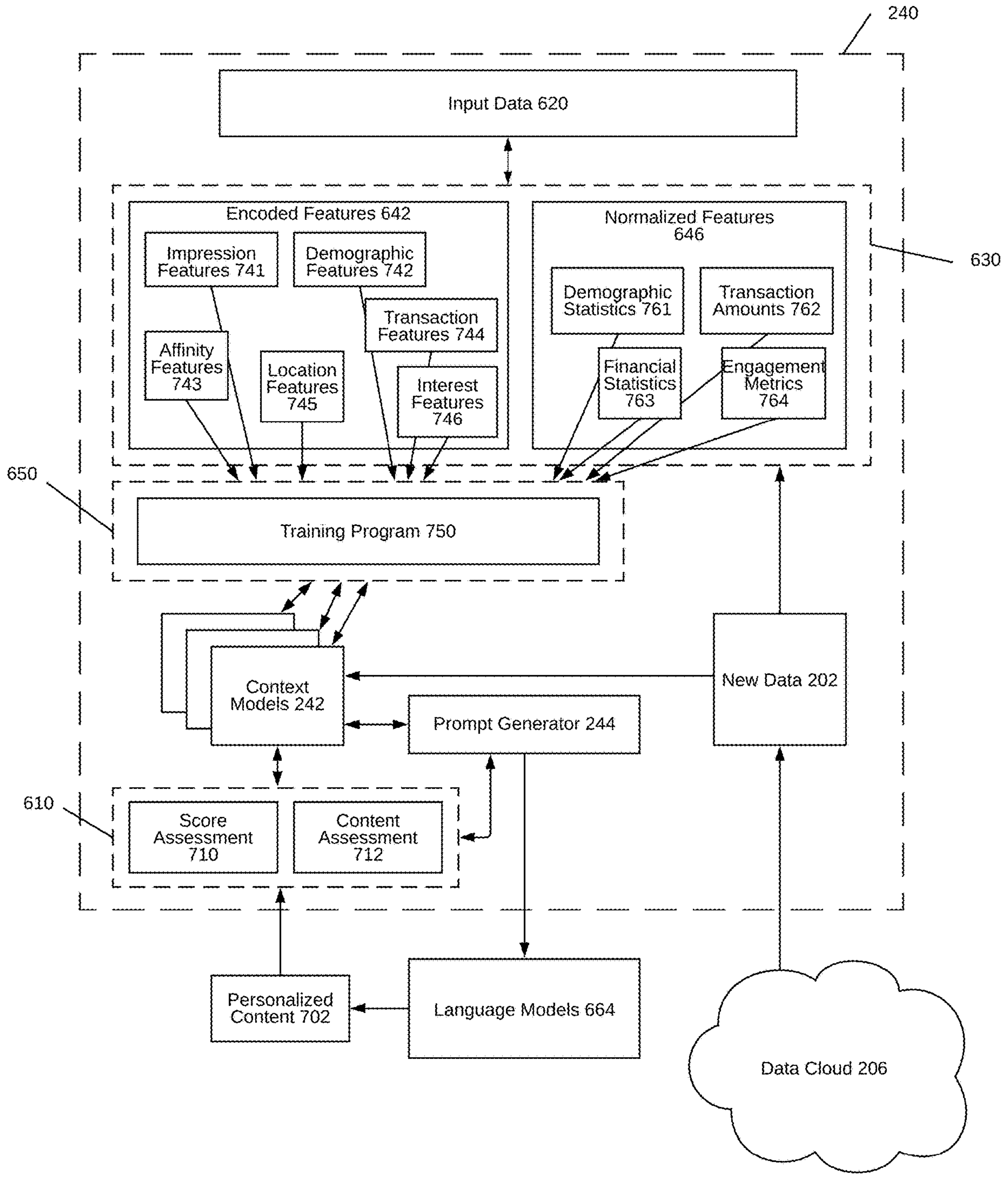
FIG. 7 illustrates more details of a training routine, according to various embodiments described herein.

FIG. 7 illustrates more details of an example training process for the context models 242. The feature generator 630 may generate encoded features 642 and normalized features 646 from the input data 620 for a segment of users. The encoded features 642 may include, for example, impression features 741 (clicks, views, survey responses, and the like) determined from event data and transaction features 744 (subscriptions, purchases, and the like) determined from transaction data. The encoded features 642 may also include demographic features 741 (e.g., gender, education level, marital status, occupation, ethnicity, and the like), affinity features 743 (product affinities, brand affinities, and the like), location features 745 (city/state/country of residence, recently visited addresses, and the like), and interest features 746 (brands, products, and topics included in recently viewed content) determined from consumer data. The normalized features 646 may include engagement metrics 764 (e.g., clicks per campaign, click through rate, view rate, display rate, delivery rate, and the like) determined from event data, transaction amounts 762 (e.g., dollar amount of home improvement products purchased in the last three months, price for a pair of shoes purchased by a user, and the like) and financial statistics 763 (credit to debit ratio, average credit card balance in the last 12 months, and the like) determined from transaction data, and demographic statistics 761 (age, credit score, zip code, and the like) determined from consumer data.

The encoded features 642 and normalized features 646 are transmitted to a training service 650 that executes a training program 750 to train the context models 242. A unique type of context model 242 may be trained for each consumer dimension and the type of context model 242 selected for each consumer dimension may be determined based on the relative performance of different model types on a test sample of identity records. For example, different types of context models 242, for example, linear machine learning models (e.g., linear regression, ridge regression, logistic regression, linear support vector machines (SVM), and the like) and/or deep learning models (e.g., non-linear SVM, SVDD models, GAN models, DBN models, and the like) may be tested for each consumer dimension. The model type that determines the users in the test sample that have a target consumer dimension with the greatest accuracy may be selected for that target consumer dimension.

The dataset of input data 620 used to train each context model 242 may also be unique. The data preprocessing module may select a segment of identity records that include a target consumer dimension as the input data 620 for training the model for that target consumer dimension. The training service 650 may execute different training programs 750 to train each type of context model 242. The training programs 750 may determine a unique set of model features for each context model 242 from the segment of identity records included in the input data 620 for the model. The sets of model features may include different combinations of the encoded features 642 and normalized features 646 that may be selected using one or more heuristics or feature selection techniques that determine a contribution metric of each feature to a particular consumer dimension. For example, the training program 750 may perform a principal component analysis (PCA) on the features extracted from the input data 620 to determine how much each feature contributes to a determination that an identity record has a particular consumer dimension. The contribution metric for each feature may be based on how frequently the feature appears in a segment of identity records, how differentiated a feature in one segment of identity records is relative to one or more other segments, and/or a range of values of the feature in the segment of identity records. The training programs 750 may select the model features to include in training samples based on the contribution metric and the model features selected for each consumer dimension may be used train the context models 242.

In various embodiments, the training program 750 may train a logistic regression model for each consumer dimension. The logistic regression models may determine a P-score or I-score between 0 and 1 that corresponds to the probability a user has a particular consumer dimension. The training programs 750 for the logistic regression models may determine an objective function for each consumer dimension. The objective function may be a weighted sum of the model features selected for each consumer dimension and each of the model features may be represented by an independent variable that includes a value for the model feature and a coefficient that corresponds to a feature weight. The feature weights may be trainable parameters that may reflect the importance of a particular feature in predicting a consumer dimension. For example, model features that are more predictive of a consumer dimension may have greater feature weights than features that are less predictive of a consumer dimension.

The features to include in the objective function of the context model for each consumer dimension may be specific to a particular consumer dimension and may be determined using a feature selection model that determines a cost function for each of the features. The value of the cost coefficient for each of the features may represent the importance of the feature to the prediction target (e.g., whether a user has a particular consumer dimension). The feature selection model may eliminate features that are not important (e.g., have a cost coefficient of 0 or below a predetermined importance threshold) or redundant (e.g., are linearly correlated or similar to at least one of the other features). To eliminate redundant features, the feature selection model may shrink the coefficient of the less important correlated/similar feature (e.g., the feature having the lower cost coefficient value) to 0 or eliminate the terms corresponding to the redundant features from the objective function. Each model feature having a non-zero cost coefficient may selected by the feature selection model to be included in the objective function for the logistic regression model.

Once the objective functions of the context model for each consumer dimension are determined, the logistic regression training program may determine an activation function for each consumer dimension. The activation functions may map the output of each objective function (e.g., the weights sum of the inputs) to a real value between 0 and 1. Accordingly, the P-scores and I-scores generated by each of the logistic regression models may correspond to the real values for each objective function. To determine the consumer dimensions for a user based on the P-scores and I-scores a decision boundary for each consumer dimension may be determined. The decision boundary may be any value between 0 and 1, with greater values for the decision boundary corresponding to a higher level of confidence for a consumer dimension. For example, a decision boundary may be set to 0 so the weighted sums of inputs for an objective function that are greater than 0 will be predicted as having the consumer dimension that corresponds to the objective function and the weighted sums that are less than 0 may be predicted as not having the consumer dimension.

The known consumer dimensions for each segment of identity records may also be included in model features. For example, the model features of the context model for the adventurous consumer dimension may include "adventurous" as an affinity feature 743. The model features of the context model for the technology consumer dimension may include "technology" as an interest feature 746. The known consumer dimensions that correspond to the dependent variable) of each of the objective functions (e.g. the predicted consumer dimension) are not included as independent variables in the objective functions. Instead, the known consumer dimensions may be used to compute the cost values for the training sample.

To train the weights for each of the independent variables in the objective function, the training program 750 may determine a cost function that determines the cost value for each user included in the training sample. The cost function may determine the average cost value across each user in the training sample to determine the overall cost for the model. The cost values may be determined by the cost function based on a comparison between the predicted consumer dimensions determined by the model and the known consumer dimensions. The cost value for correct predictions may be zero and the cost value for incorrect predictions may be significant to heavily penalize the model for incorrect predictions.

During the training process, an optimization function (e.g., a gradient function implementing a gradient decent approach) may determine the optimal weights of each independent variable. The gradient function may initialize each of the weights to a random value and calculate the gradient of the cost function at this point. The gradient function then tests different values for each weight by increasing or decreasing the value of each weight by incremental value (e.g., 0.1, 0.01, and the like) determined based a predetermined learning rate (e.g., step size) and calculating the gradient of the cost function at the updated point. The gradient function may continue testing different values for the weights until a predetermined tolerance level is achieved (e.g., the gradient is below a minimum cost threshold) or a maximum number of testing iterations (e.g., cycles of modifying weight values based on the step size and computing gradients) is reached. The gradient function may output a set of optimal weights (e.g., model weights 652) for each of the independent variables in the objective function of the model. The trained context models may then be validated on a validation set of users by the validation service 610. To validate the trained context models, the validation service 610 may perform a score assessment 710 that scores each of the identity records in a validation set and determines the consumer dimensions for each of the records based on the I-scores and P-scores. The dimensions predicted by the context models are compared to the known consumer dimensions for the identity records to determine the accuracy of each context model. Context models that achieve a desired level of performance (e.g., predict consumer dimensions for users at a rate that meets or exceeds a performance threshold) may be deployed to production and used by the content engine to determine consumer dimensions. Models that do not achieve a desired level of performance (e.g., predict consumer dimensions for users at a rate that is below a performance threshold) may be retained by the training service 650 until the desired level of performance is achieved (e.g., the prediction accuracy rate for the context model meets or exceeds the performance threshold).

To continuously improve the performance of the context models over time, the logistic regression models may be retrained by the training service on new data recorded in the data cloud. For example, the logistic regression models may be retrained on different or larger datasets that includes new model features determined from new data (e.g., new and/or updated identity records). The training service 650 may also recalculate the model features by performing a new feature selection process, modify the objective function, and/or change one or more hyperparameters (e.g., the cost function, the step size or number of testing iterations for the gradient function, and the like) based on new or updated identity records to improve performance. For example, additional independent variables corresponding to new model features determined from new and/or updated identity records may be added to the objective function. The step size and/or the number of testing iterations of the gradient function may also be increased or reduced to improve model performance and/or improve training efficiency.

To enable continuous improvements of the context models 242, the data cloud 206 may provide new data and new and/or updated identity records to the feature generator 630, in real time as the new data 202 and/or new and/or updated identity records are recorded in the data cloud. The feature generator may determine new encoded features 642 and/or normalized features 646 from the new data. The training service 650 may select new model features that include one or more of the new encoded features 642 and/or normalized features 646. The new model features may be used to retrain the context models 242 on the new data 202. The data cloud 206 may also provide new data 202 including new and/or updated identity records to the context models 242 in order to determine consumer dimensions for new users and/or users with updated identity records dynamically in real time as new consumer data, event data, and/or transaction data is recorded in the data cloud 206. For example, each time a user purchases a product, browses a web page, opens an email, or performs another activity that is recorded as event data in their identity record, the consumer dimensions for the user may be re-determined by the context models 242. Determining the consumer dimensions for users based on new data 202 lifts the engagement rates for the personalized content by ensuring the personalized content is based on the most current transactions, browsing activity, and engagement behaviors for each user.

The context models 242 may also include one or more non-linear models that generate the P-scores and I-scores for identity records. The non-linear models may include a deep learning model (e.g., a non-linear SVM model, SVDD model, GAN model, DBN model, and the like) that transforms n-dimensional feature vectors including a selection of the encoded features 642 and normalized features 646 and one or more known consumer dimensions into an m-dimensional representation of identity records that have a particular consumer dimension (e.g., adventurous, intelligent, interested in food, interested in athletic apparel, and the like). An output layer may map the m-dimensional representation to a P-score or I-score between 0 to 1. The deep learning implementations of the context models 242 may determine consumer dimensions for identity records based on a comparison between the scores representing features associated with a particular consumer dimension that are learned from the training data and the scores for the identity record.

Figure 8:
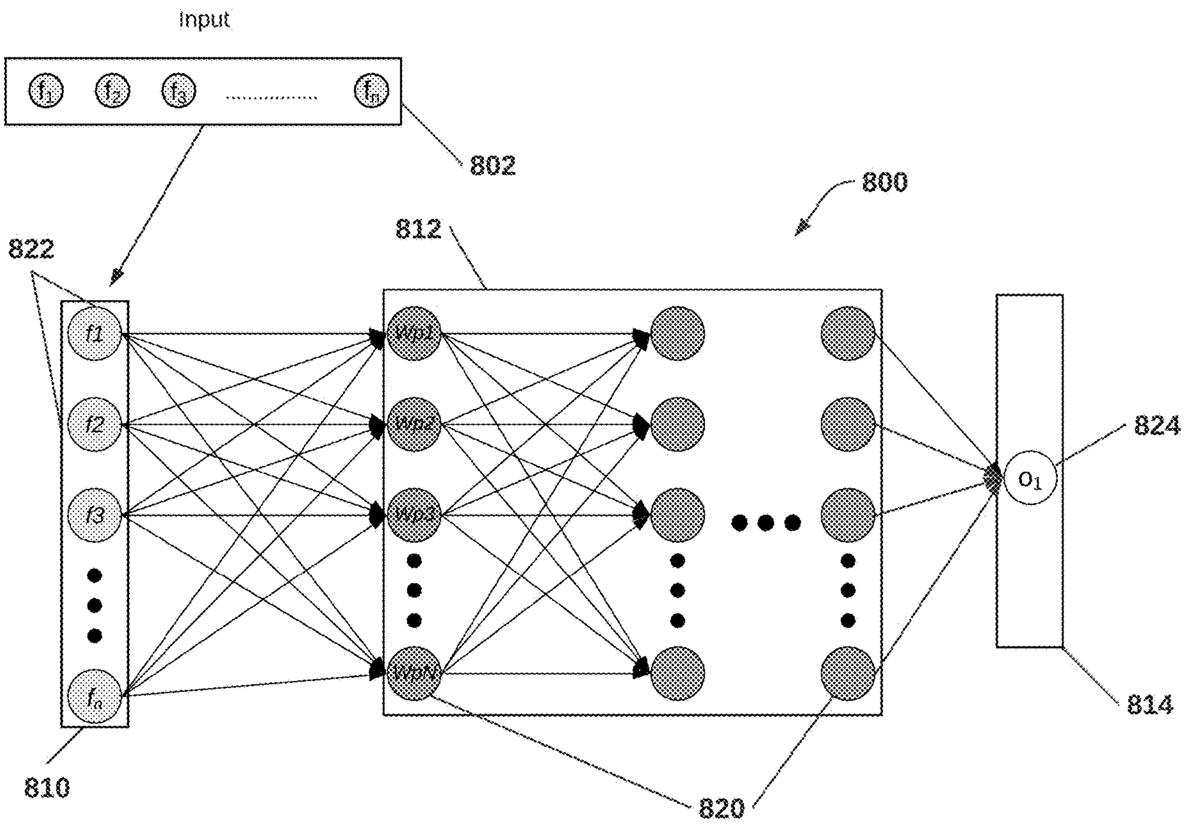
FIG. 8 illustrates more details of a scoring model, according to various embodiments described herein.

FIG. 8 illustrates more details of a deep neural network 800 architecture for the deep learning implementations of the context models. The deep neural network may include an input layer 810, multiple hidden layers 812, and an output layer 814. Each layer may include one or more nodes. The input layer nodes 822 may correspond to a selection of model features included in the feature vector (e.g., the n-dimension representation of an identity record included in an input vector 802) provided by the feature generator 630. The output layer 814 may contain a single output layer node 824 that provides a numerical prediction (P-scores and I-scores) on a normalized (e.g., between 0 to 1) or continuous scale.

During training, a training program 750 for deep learning models executed by the training service 650 may initialize the weights for each of the parameters (Wp1, . . . , WpN) in each of nodes 820 included in the hidden layers 812 using an initializer (e.g., a normal initializer that assigns random values for weights in a normal distribution). In various embodiments, initializing the nodes of the hidden layers 812 may involve determining at least one initial value of one or more weights for hundreds of thousands of trainable parameters. An activation function (e.g., a rectified linear unit (ReLU) activation function) is then applied to the weighted sum output from each hidden layer node 820 to generate the output for the node. A second activation function (e.g., a sigmoid activation function, linear activation function, and the like) may be selected for the output layer 814 and used to determine a single P-score or I-score from the weighted sums output by each of the hidden layers 812. The P-scores and I-scores may correspond to a probability that a user has a consumer dimension. The output layer 814 may also have a classification node the compares the P-score and I-scores to a classification threshold to determine if an identity record has a particular consumer dimension. For example, the context models may determine identity records having scores that meet or exceed the classification threshold have a consumer dimension and identity records having scores that are below the classification threshold do not have a consumer dimension.

The training service may execute a training program for deep learning models that may train a deep neural network for a target consumer dimension. The deep learning implementation of the context models may be trained using a dataset including feature vectors for multiple identity records and the known consumer dimensions for each identity record. During training, the deep neural network may learn the patterns of features in the dataset that are indicative and not indicative of the target consumer dimension. To train the deep neural network, the training service may initialize the weights of each node in the hidden layers 812 by determining an initial value for each of the weights. The initial model scores each identity record in the training dataset and classifies each record as having or not having the target consumer dimension based on the scores. The training service 650 may determine a loss function (e.g., binary cross entropy loss, hinge loss, mean absolute error, and the like)

for the model and determine an error value (e.g., a difference between the predicted output and the known output) for the loss function based on the consumer dimensions determined by the initial model. The loss function may be determined for each deep neural network individually and may compare the predicted consumer dimensions for each record to their known dimensions.

The training service 650 may determine a gradient function (e.g., a gradient descent algorithm) that backpropagates the error from the output layer 814 back through the hidden layers 812 of the model by calculating a loss gradient for each weight. For example, the loss gradients may be partial derivatives of the loss function with respect to each weight and may represent the portion of the error value attributed to each weight in the hidden layer 812. The training service 650 may adjust the weights of the hidden layer nodes 820 in the direction of the negative gradient by multiplying the current value for each weight in the hidden layer 812 by a learning rate (e.g., 0.1 or any other predetermined step size) and subtracting the result from the gradient values to determine the updated weight values for each hidden layer node 820. The training service 650 may determine an updated deep learning context model by setting the weight for each hidden layer node 820 to the updated weight values.

During each training epoch, the training service 650 may retrain the updated model by rescoring each of the identity records in the training dataset based on the updated weights and determining new consumer dimensions for each record based on the new P-scores or I-scores. An error value may be calculated for the updated model using the loss function and the gradient function may backpropogate the error back through the hidden layers 812 by adjusting the weights for each hidden layer node 820 based on the loss gradients for each weight. The next iteration of the model may then be retrained using the loss function and gradient functions as described above. The training service 650 may continue to retrain new iterations of the deep learning context models to improve the performance of the context models.

Referring back to FIG. 7, after a predetermined number of training epochs, a validation service 610 may validate the deep learning implementation of the context model 242 by performing a score assessment 710 that determines the prediction accuracy of the trained context model 242 on a validation set of feature vectors determined from a set of identity records that were withheld from the training dataset. If the prediction accuracy of the context model 242 meets or exceeds a performance threshold, the deep learning implementation of the context model 242 may be deployed to production and used to determine consumer dimensions for input identity records. If the prediction accuracy of the deep learning implementation of the context model 242 is below a performance threshold, the deep learning context models may be retrained by the training service 650 until the desired level of performance is achieved (e.g., the prediction accuracy rate for the deep learning context model meets or exceeds the performance threshold).

To continuously improve the performance of the models over time, the deep learning context models may be retrained by the training service 650 on new data 202 stored in the data cloud 206. The deep learning context models may be retrained on a different and/or larger training data set that includes model features determined from new data 202 (e.g., new and/or updated identity records). For example, additional model features calculated for new and/or updated data fields of the identity records may be appended to the feature vectors included in the training data and the training service 650 may retrain the deep learning context models using the expanded feature vectors. The training service 650 may also modify the hidden layers of the deep learning context models by adding, subtracting, or modifying one or more hidden layer nodes. The training service 650 may also modify one or more hyperparameters used to train the deep learning context model. For example, the training service 650 may modify the loss function, the gradient function, the step size or number of training epochs, and the like based on new and/or updated identity records to improve the performance of the deep learning context models. The step size and/or the number of training epochs may also be increased or reduced to improve model performance and/or improve training efficiency. The deep learning context models may also be used to determine consumer dimensions for users having new and/or updated identity records included in new data 202 to update the contextual insights provided to the language models.

After training and validation, the training service 650 may build one or more context models 242 that are used by the content engine to determine consumer dimensions for identity records. For example, the training service 650 may build deep learning models using the trained model layers and logistic regression models using the trained model weights. A prompt generator 244 may determine prompts for language models 664 using one or more consumer dimensions determined by the context models 242. For example, the prompt generator 244 may embed one or more consumer dimensions into a context section of a prompt for determining a piece of personalized content 702. The prompt generator 244 may also filter and/or prioritize the consumer dimensions based on one or more criteria. For example, the prompt generator 244 may filter out consumer dimensions that are on a predefined list of personal, harmful, and/or creepy consumer dimensions to prevent the filtered dimensions from being incorporated into prompts. The prompt generator 244 may also prioritize one or more of the consumer dimensions to ensure the prioritized dimensions are included in prompts. For example, the prompt generator 244 may prioritize dimensions that have been included in personalized content 702 that achieved a threshold level of engagement in one or more completed campaigns run of the publishing system or dimensions that are on a predefined list of consumer dimensions associated with a particular brand or product.

The prompts determined by the prompt generator 244 and the personalized content determined by the language models 664 may be reviewed by the validation service 610. For example, a content assessment 712 of the prompts may be performed by the validation service 610 to confirm the position of the embedded consumer dimensions within the prompt is accurate. The validation service 610 may also perform a content assessment 712 on the personalized content 702 to confirm the personalized content 702 is not related to one or more filtered consumer dimensions and/or confirm the personalized content 702 is related to one or more prioritized consumer dimensions.

The validation service 610 may also perform content assessments 712 of the personalized content 702 generated by the language models 664. To perform the content assessments 712, the validation service 610 may determine one or more engagement metrics from the tracking data collected by a publishing system connected to the learning module 240. The training service 650 may align (e.g., fine tune) the language models 664 based on the engagement metrics to improve the performance of the language models 664. The training service 650 may execute (e.g., perform) alignment using a machine learning algorithm. In various embodiments, the machine learning algorithm may include a reinforcement learning algorithm, such as proximal policy optimization. Aligning the language model may also include maximizing the engagement metric determined for one or more model outputs (e.g., pieces of content that include personalized content generated by the language models). The engagement metrics of the one or more outputs may include, for example, an open rate, click rate, view rate, impression rate, and/or conversion rate for pieces of content that include the personalized content 702. The engagement metrics may be computed based on tracking data recorded for pieces of content published on an online publication network during a completed campaign executed (e.g., run) by the publication system. The tracking data may include event data for completed campaigns that includes engagement events (e.g., impressions, clicks, opens, views, conversions, and the like) and publishing events (e.g., content displays, content deliveries, and the like). The publication system may record tracking data for each piece of content including personalized content 702 and the tracking data may be provided to the validation service 610 to calculate the engagement metrics. The publication system may also determine one or more engagement metrics and provide the engagement metrics to the validation service 610.

To align the language models 664, the validation service 610 may compare the one or more engagement metrics determined for a piece of content that includes personalized content to an engagement threshold. If the engagement metric determined for the piece content meets or exceeds the engagement threshold (e.g., the click rate for the piece of content is at least 0.3), the validation service 610 may add one or more consumer dimensions included in the prompts used to generate the personalized content 702 in the engaging piece of content to a prioritized list of consumer dimensions used by the prompt generator 244. If the engagement metric determined for the piece of content is below the engagement threshold (e.g., the conversion rate for the sample is below 0.15) the validation service 610 may add one or more of the consumer dimensions included in the personalized content to a list of dimensions that are filtered out by the prompt generator 244. Prioritizing the consumer dimensions that produce engaging content maximizes the personalized content 702 determined by the language models 664 for user engagement by ensuring the prompt generator 244 uses the consumer dimensions shown to produce engaging content more frequently when generating prompts personalized content 702 for campaigns that target users having one or more of the prioritized dimensions. Similarly, filtering out the consumer dimensions that do not produce engagement content further maximizes the personalized content 702 determined by the language models 664 for user engagement by ensuring the prompt generator 244 does not use consumer dimensions shown to be unable to produce engaging content when generating prompts for personalized content 702 for campaigns that target users having one or more of the filtered dimensions.

Narrowing the number of consumer dimensions included in the context portion of the prompt to a minimum number of the highest performing consumer dimensions (e.g., the consumer dimensions that produce personalized content in the pieces of content with high engagement metrics) reduces the overall number of tokens in the prompt that are ingested by the language models 664 during personalized content generation. Language models 664 may be incredibly complex (e.g., include billions of trainable parameters) and compute intensive to query (e.g., require hundreds of teraflops of computational power to ingest prompts and generate a single token of output). At this scale, reductions in the amount of tokens ingested by the language models 664 during personalized content generation may have significant impacts in model efficiency and cost. By simplifying the prompts submitted to the language models 664, the validation service 610, improves the computational efficiency of the language models 664 and reduces the cost per query while also maximizing the outputs of the language models for user engagement.

The validation service 610 may also align the language models 664, by creating training datasets including pieces of content having one or more engagement metrics that exceeds and engagement threshold and retraining the language models 664 on the training datasets. The validation service 610 may format the training samples (e.g., the pieces of content having engagement metrics exceeding the threshold) into training files that include a prompt for a language model 664 for each piece of content. The prompt may include messages recorded during the process of generating the personalized content of the piece of content and the messages may include the personalized content included in the piece of content and an original prompt used to generate the personalized content. Each message may be formatted to have a role (e.g., user, system, and the like) and content (e.g., lines of text included in the personalized content and/or original prompt). The natural language prompt for each piece of content may also be formatted as a prompt and completion pair that includes the original prompt for the language model 664 as the prompt and the personalized content generated based on the original prompt as the completion.

The language model prompts for the pieces of content in the training samples may be aggregated into a training file formatted to be received by the language models 664. The training file may also include a description of the language model prompts (e.g., the prompts in the training sample include examples of personalized content included in pieces of content that received engagement rates) and instructions for aligning the language models 664 (e.g., generate personalized content for a prompt using the example personalized content included in pieces of content receiving high engagement rates as the basis for generating the response). A dispatcher may generate one or more alignment jobs for the training files that display the natural language prompts in each file to the language models 664. The fine tuning jobs may align the language models 664 based on the prompts in the training files to maximize the personalized content generated by the language models 664 for one or more engagement metrics. Aligning the language models 664 may include at least one of adding, removing, modifying a model parameter of the language model, or any other model training operation. For example, the at least one processor implementing the validation service 610 may add, deactivate, or remove a node and/or layer of the model. As another non-mutually exclusive example, the at least one processor implementing the validation service 610 may add or remove a connection between nodes within the language model. As another non-mutually exclusive example, the at least one processor implementing the validation service 610 may modify a language embedding space of the language model 664 that is associated with a consumer dimension included in one or more of the original prompts included in the training file. The aligned language models may be stored and incorporated into the language models 664 used to generate personalized content 702.

Figure 9:
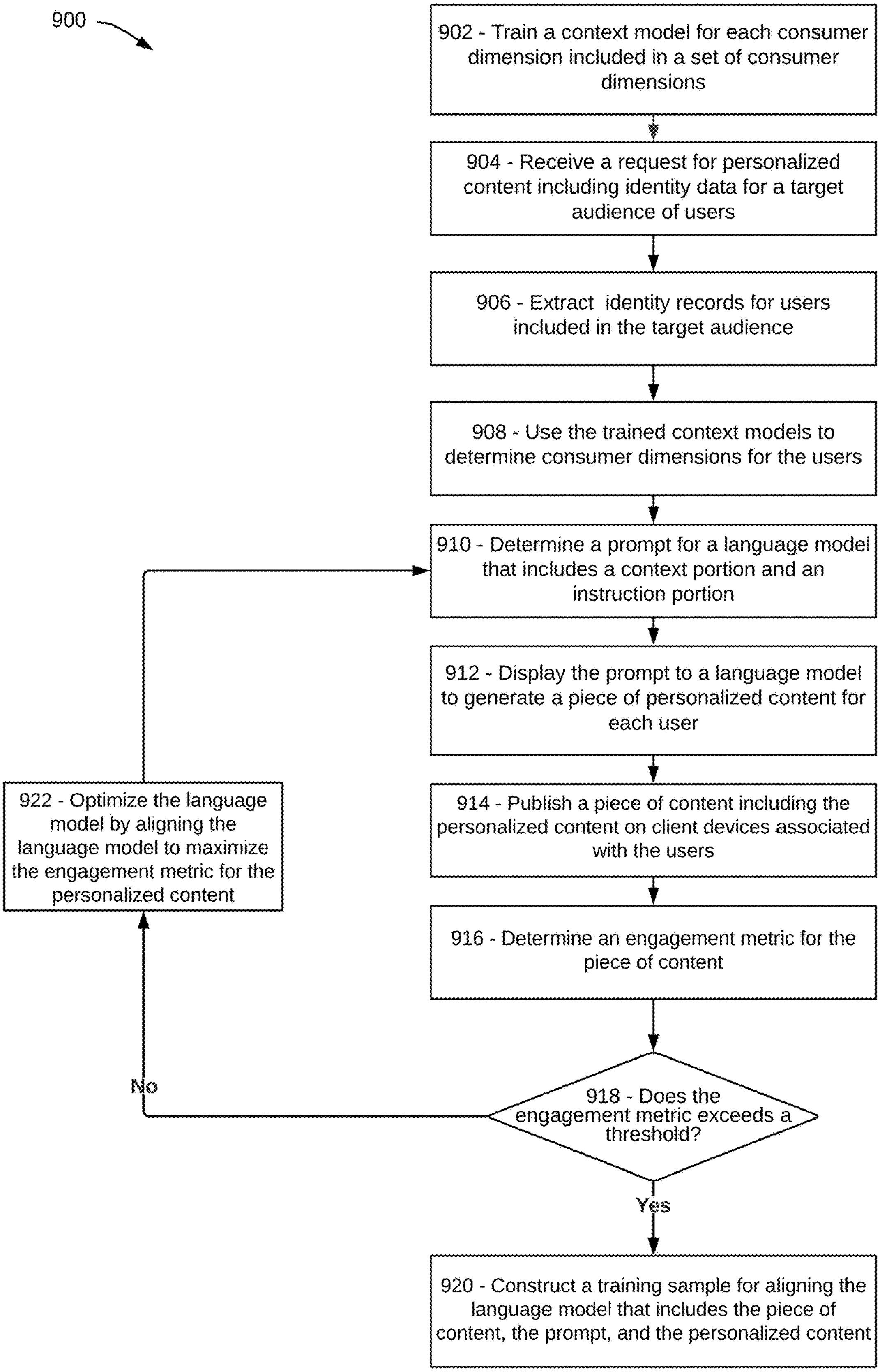
FIG. 9 is a flow chart depicting operations in a method, according to an example embodiment.

Some present examples also include methods. FIG. 9 is a block diagram of a process 900 of optimizing language models based on one or more context insights from a context model. At step 902, multiple context models are trained by the learning module. The context models may include logistic regression models and or deep learning models that determine a plurality of consumer dimensions based on P-scores and I-scores. The learning module may train a unique context model for every consumer dimension included in a set of consumer dimensions included in identity data stored in a data cloud. Each unique context model may be trained using different segments of identity records and different sets of model features determined from the consumer data, event data, and/or transaction data included in each segment of identity records. The context models for each consumer dimension may also have different model types, model architectures, and/or training algorithms.

At step 904, the content engine may receive a request for personalized content from a client device and/or publishing system. The request may include identity data for one or more users included in a target audience. The request may also include one or more campaign configuration settings for a media campaign configured to distribute pieces of content that include personalized content generated by the content engine. The campaign configuration settings may include, for example, brands, products, or other topics.

At step 906, an identity component may locate and extract identity records for each user in the target audience. The identity records may be extracted from one or more identity graphs stored in a data cloud. The identity component may identify the identity records linked to each user in the target audience by matching the identity data included in a request with an identifier (e.g., name, user name, email address, physical address, and the like) included in an identity record and/or cluster of identity records. At step 908, the trained context models may determine consumer dimensions for the users in the target audience based on the consumer data, event data, and/or transaction data included in the identity records.

At step 910, a prompt generator may determine a prompt for a language model for each user in the target audience. The prompt may include a context portion that provides context about the user and an instruction portion that provides a description of the type of content to be generated by the language model. The context portion may include an identifier (e.g., name) for the user and one or more consumer dimensions for the user determined by the context models.

FIG. 10 illustrates an example language model prompt 1000 determined by the prompt generator. The language model prompt 1000 may be formatted as an API call that is transmitted to an API (or other language model interface) for accessing the language model and/or a generative AI system including one or more language models. The language model prompt 1000 may include a series of conditional segments 1002 that customize the content request(s) included in the language model prompt 1000 based on available categories of consumer dimensions for each identity record. The language model interface may select different language models to use to generate personalized content based on the conditional segment 1002 of the natural language prompt that is executed (e.g., selected and run) for each user. For example, a first language model (e.g., a language model tuned for personality context) may be used to generate personalized content when only personality type consumer dimensions are available, a second language model (e.g., a language model tuned for interest context) may be used to generate personalized content when only interest type consumer dimensions are available, a third language model (e.g., a language model tuned for complete context) may be used to generate personalized content when both personality and interest type consumer dimensions are available. The personality type consumer dimensions (e.g., p-dimensions determined based on P-scores) may include personality traits, behaviors, and the like. The interest type consumer dimensions (e.g., i-dimensions determined based on I-scores) may include brand affinities, product affinities, other topics of interest, and the like). Other categories of consumer dimensions may include combinations of interest type consumer dimensions and personality type consumer dimensions. For example, predetermined sets of consumer dimensions that are related to real estate, automotive, retail, or other industry verticals.

The conditional segments 1002 of the natural language prompts 1000 may each include a context portion at the beginning of the statement that provides more context about a user. The context portion may include one or more identifiers linked to the user and one or more consumer dimensions determined for the user. To facilitate rapid customization of the language prompts, the context portion may also include one or more tags 1004 that serve as placeholders for embedding identifiers and consumer dimensions extracted from identity records. The conditional segments 1002 may also include an instruction portion that may include one or more words or phrases that describe the types of personalized content to be generated by the language model. For example, the instruction portion may describe the length of the requested personalized content (e.g., write a phrase, sentence, paragraph, page, and the like), the style or tone of the language in the requested personalized content (e.g., write a paragraph that is charming, witty, professional, and the like), and one or more specific words and phrases to include in the requested personalized content along with the position of the words/phrases in the content (e.g., begin the personalized content with the phrase "Let me introduce", end the personalized content with "Have a great day!", and the like.)

The conditional segment may begin with a condition 1006 that must be satisfied for the content request included in the conditional segment 1002 to be submitted to the natural language model. The condition 1006 may require one or more one or more categories of consumer dimensions (e.g., have at least one interest type consumer dimension or personality type consumer dimension) to be available for a user in order to submit the content request corresponding to the condition 1006. For example, the condition 1006 requires at least one interest type consumer dimension (e.g., i-dimension) to be available in order to complete the content request. Other conditions may require two or more categories of consumer dimensions to be available and/or at least one dimension that is on a prioritized list to be available. Other conditions may filter the dimensions included in an identity record by excluding dimensions that are on a list of filtered or deprioritized dimensions.

The prompt generator may determine a language model prompt for a particular user by extracting an identifier and one or more consumer dimensions from the identity record and inserting the extracted identifier and one or more consumer dimensions determined for the user into the tags included in each valid conditional segment (e.g., each conditional segment that corresponds to a category of consumer dimensions that has at least one available consumer dimension). The language model prompts may include several completed conditional segments to introduce more of the unique consumer dimensions for each user to the language model. Conditional segments that are invalid (e.g., do not have at least one valid entry for each of their conditions) are not completed and may be excluded from the language model prompt. Excluding the invalid conditional segments may simplify the language model prompts and, thereby, improve the efficiency of the operations performed during content creation.

At step 912, the natural language prompt for each user in a target audience is displayed to a language model and an output of personalized content is generated for each user. The personalized content may be unique to each user and may be generated using natural language prompts that include unique combinations of identifiers and customer dimensions. At step 914, a publishing system may build a piece of content that includes the personalized content generated for each user. The publishing system may build a unique piece of content for each user in the target audience that includes unique personalized content. The publishing system may run a media campaign that publishes each piece of content to one or more client devices associated with the user of the target audience. The publishing system may track the response of each user to each piece of content. To determine the response from each user, the publishing engine may search the identity records in the data cloud to match the identifier for a user included in each language model prompt to a device identifier for a client device linked to the user. The publishing system may collect event data from each of the client devices that received a piece of content included personalized content. The event data may include one or more engagement events and/or delivery events (e.g., deliveries, opens, views, clicks, conversions, and the like) for the piece of content including the personalized content.

At step 916, the publishing system may determine an engagement metric (e.g., delivery rate, open rate, view rate, click rate, conversion rate, and the like) for each piece of content including personalized content. For example, the publishing system may run a media campaign that displays a piece of content including personalized content on one thousand different client devices. The publishing system may track each of the pieces of content and record engagement events from each of the devices. The publishing engine may then determine the ratio of click events to delivery events to determine a click rate (e.g., 0.3 or 30 clicks for every one thousand pieces of personalized content delivered) for the pieces of content sent in the campaign.

At step 918, a validation service may compare the engagement metric to an engagement threshold. If the engagement metric exceeds the engagement threshold (Yes at 918, e.g., the click rate of 0.3 exceeds the threshold click rate of 0.25), the language model may be aligned based on the piece of content that generated high engagement. For example, one or more training samples for a training dataset that may be used to align the language may be constructed at, step 920. The training samples may each include the piece of content, the personalized content included in the piece of content, and the original language model prompt used to generate the personalized content. The validation service 610 may also add one or more consumer dimensions included in the natural language prompt that generated the personalized content for the piece of content to a prioritized list of consumer dimensions that is used by the prompt generator to determine which consumer dimensions to include in language model prompts.

If the engagement metric does not exceed the engagement threshold (No at 918, e.g., a click rate of 0.2 is below the threshold click rate of 0.25), the language model may be optimized by aligning the language model to maximize the personalized content for the engagement metric, at step 922. The language model may be aligned (e.g., fine tuned) using a training data set of training samples that include pieces of content that generated engagement metrics that exceeded the engagement threshold. The language model may also be aligned by filtering out the consumer dimensions used to generate personalized content for pieces of content that did not meet a threshold level of engagement to exclude the filtered consumer dimensions from future prompts. For example, the validation service may add the filtered dimensions to a filter list of consumer dimensions that is used by the prompt generator to determine the consumer dimensions to include in language model prompts. The consumer dimensions on the filter list may not be selected by the prompt generator so that they are excluded from future prompts and replaced with other dimensions.

In this disclosure, the following definitions may apply in context. A "Client Device" or "Electronic Device" refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Communications Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" (also referred to as a "module") refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:

one or more processors; and a memory storing instructions that, when executed by at least one processor in the one or more processors, cause the at least one processor to perform operations for optimizing language models for user context, the operations comprising:

training multiple context models, the multiple context models including a unique context model for each consumer dimensions included in a set of consumer dimensions;

receiving a request for personalized content, the request including identity data for one or more users;

identifying one or more identity records for each of the one or more users based on the identity data, each of the one or more identity records including an identifier for a particular user;

using the multiple context models to determine one or more consumer dimensions for the one or more users, the one or more consumer dimensions each having a dimension type;

determining a natural language prompt that includes a context portion and multiple conditional segments, the context portion including the one or more consumer dimensions, the multiple conditional segments each including a condition that requires the one or more identity records to include a consumer dimension of the dimension type that corresponds to the one or more consumer dimensions in the context portion;

obtaining a piece of the personalized content from a language model based on the natural language prompt;

determining an engagement metric for a piece of content including the piece of the personalized content; and optimizing the language model by aligning the language model to maximize the engagement metric for the personalized content.

2. The system of claim 1, wherein the at least one processor is further configured to identify the one or more identity records by parsing an identity graph hosted by a data cloud to match the identity data with the identifier of the particular user included in the one or more identity records.

3. The system of claim 2, wherein the at least one processor is further configured to match the identity data with the identifier of the particular user using a tiered matching scheme that prioritizes the identifier of the particular user over one or more other identifiers in the one or more identity records based on a recency metric describing a time when the identifier was included in a piece of event data stored in the data cloud.

4. The system of claim 1, wherein the at least one processor is further configured to display the piece of content including the obtained personalized content on a client device having a device identifier linked to the identifier of the particular user included in the one or more identity records.

5. The system of claim 1, wherein the one or more consumer dimensions include personality type consumer dimensions that include at least one of a personality trait and a behavior of the one or more users.

6. The system of claim 1, wherein the one or more consumer dimensions include interest type consumer dimensions that include at least one of a product affinity, a brand affinity, and a topic of interest of the one or more users.

7. The system of claim 1, wherein the at least one processor is further configured to filter the at least one of the one or more consumer dimensions by:

confirming at least one consumer dimension is included in a filter list;

removing the at least one consumer dimension from the natural language prompt; and replacing the at least one consumer dimension with a new consumer dimension that is not included in the filter list.

8. The system of claim 1, wherein the language model includes a second neural network having a generative pre-trained transformer architecture, the second neural network trained on a corpus of text documents.

9. The system of claim 1, wherein the at least one processor is further configured to train the multiple context models using a gradient decent approach.

10. The system of claim 9, wherein the gradient decent approach comprises determining a p-score for a plurality of identity records using one or more hidden layers of a neural network;

determining a consumer dimension for one or more of the identity records based on the p-score for each of the identity records, the determining using an output layer of the neural network;

determining a gradient loss for a weight of each node included in the hidden layers;

backpropagating the loss through the hidden layers by adjusting the gradient loss based on a learning rate to obtain a new weight for each node included in the hidden layers; and building an updated neural network using the new weight for each node.

11. A method for optimizing language models for user context, the method comprising:

training multiple context models, the multiple context models including a unique context model for each consumer dimension included in a set of consumer dimensions;

receiving a request for personalized content, the request including identity data for one or more users;

identifying one or more identity records for each of the one or more users based on the identity data, each of the one or more identity records including an identifier for a particular user;

using the multiple context models to determine one or more consumer dimensions for the one or more users, the one or more consumer dimensions each having a dimension type;

determining a natural language prompt that includes a context portion and multiple conditional segments, the context portion including the one or more consumer dimensions, the multiple conditional segments each including a condition that requires the one or more identity records to include a consumer dimension of the dimension type that corresponds to the one or more consumer dimensions in the context portion;

obtaining a piece of the personalized content from a language model based on the natural language prompt;

determining an engagement metric for a piece of content including the piece of the personalized content; and optimizing the language model by aligning the language model to maximize the engagement metric for the personalized content.

12. The method of claim 11, further comprising identifying the one or more identity records by parsing an identity graph hosted by a data cloud to match the identity data with the identifier of the particular user included in the one or more identity records.

13. The method of claim 12, further comprising matching the identity data with the identifier of the particular user using a tiered matching scheme that prioritizes the identifier of the particular user over one or more other identifiers in the one or more identity records based on a recency metric describing a time when the identifier was included in a piece of event data stored in the data cloud.

14. The method of claim 11, further comprising displaying the piece of content including the obtained personalized content on a client device having a device identifier linked to the identifier of the particular user included in the one or more identity records.

15. The method of claim 11, wherein the one or more consumer dimensions include personality type consumer dimensions that include at least one of a personality trait and a behavior of the one or more users.

16. The method of claim 11, wherein the one or more consumer dimensions include interest type consumer dimensions that include at least one of a product affinity, a brand affinity, and a topic of interest of the one or more users.

17. The method of claim 11, further comprising:

confirming at least one consumer dimension is included in a filter list;

removing the at least one consumer dimension from the natural language prompt; and replacing the at least one consumer dimension with a new consumer dimension that is not included in the filter list.

18. The method of claim 11, wherein the language model includes a second neural network having a generative pre-trained transformer architecture, the second neural network trained on a corpus of text documents.

* * * * *